United States Patent
Hedrich

(10) Patent No.: US 7,364,167 B2
(45) Date of Patent: Apr. 29, 2008

(54) INJECTOR

(75) Inventor: Adrian Hedrich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/577,991

(22) PCT Filed: Oct. 25, 2004

(86) PCT No.: PCT/EP2004/052659

§ 371 (c)(1),
(2), (4) Date: Jan. 17, 2007

(87) PCT Pub. No.: WO2005/042963

PCT Pub. Date: May 12, 2005

(65) Prior Publication Data

US 2007/0209640 A1    Sep. 13, 2007

(30) Foreign Application Priority Data

Nov. 3, 2003  (DE) .............................. 103 51 159
Mar. 27, 2004 (DE) ...................... 10 2004 015 133

(51) Int. Cl.
*F16J 15/12* (2006.01)
(52) U.S. Cl. .................. 277/641; 277/611; 123/472
(58) Field of Classification Search ................ 123/495, 123/472; 277/641, 611, 638, 639, 640; 239/88–96, 239/585.1–585.5
See application file for complete search history.

(56) References Cited

U.S. PATENT DOCUMENTS

| | | | |
|---|---|---|---|
| 3,869,132 A * | 3/1975 | Taylor et al. ............... | 277/608 |
| 5,129,658 A | 7/1992 | Berton et al. | |
| 5,342,066 A | 8/1994 | Henley | |
| 5,551,703 A * | 9/1996 | Morvant ..................... | 277/584 |
| 6,173,969 B1 * | 1/2001 | Stoll et al. .................. | 277/630 |
| 6,386,545 B1 * | 5/2002 | Evans ......................... | 277/336 |
| 6,814,358 B2 * | 11/2004 | Keck ........................... | 277/638 |
| 2003/0102452 A1 | 6/2003 | Ruthhardt et al. | |
| 2004/0021011 A1 * | 2/2004 | Ruthardt et al. ........ | 239/533.11 |
| 2005/0116056 A1 * | 6/2005 | Hans et al. .................... | 239/5 |

FOREIGN PATENT DOCUMENTS

| | | |
|---|---|---|
| DE | 197 29 392 A1 | 1/1999 |
| DE | 100 20 870 A1 | 10/2001 |
| GB | 1122691 | 8/1968 |

* cited by examiner

*Primary Examiner*—Carl S. Miller
(74) *Attorney, Agent, or Firm*—Ronald E. Greigg

(57) ABSTRACT

The invention relates to an injector for a common rail injection system of an internal combustion engine, having an injector housing, a valve element disposed in the injector housing, a sealing ring acting as a seal between a high-pressure region and a low-pressure region of the injector, and a support ring, disposed together with the sealing ring in an annular chamber between the injector housing and the valve element, for bracing the sealing ring, which is provided, in its underside remote from the sealing ring, with a plurality of relief grooves spaced apart in the circumferential direction and, in its outer circumferential edge, with a plurality of recesses spaced apart in the circumferential direction. The relief grooves and the recesses are disposed in offset fashion in the circumferential direction.

20 Claims, 2 Drawing Sheets

INJECTOR

CROSS-REFERENCE TO RELATED APPLICATION

This application is a 35 USC 371 application of PCT/EP 2004/052659 filed on Oct. 25, 2004.

BACKGROUND OF THE INVENTION

1. Field of the Invention The invention relates to an injector for a common rail injection system of an internal combustion engine.

2. Prior Art

Common rail injection systems have a plurality of injectors, which under the control of an electronic motor controller are supplied with fuel by a high-pressure pump from a central high-pressure reservoir known as a common rail and inject the fuel into the combustion chambers of the engine.

From German Patent Disclosure DE 100 20 870 A1, a common rail injector is already known whose injector housing contains a valve element that is inserted into a stepped bore in the injector housing and is sealed from the injector housing by a soft sealing ring, which serves as a seal between a high-pressure region and a low-pressure region of the injector. The sealing ring is inserted into an annular chamber above an annular shoulder of the stepped bore and is braced against the annular shoulder. To prevent the sealing ring from being pressed or extruded into a narrow annular gap, located below the annular shoulder, between the valve element and the injector housing as a result of the varying fuel pressures of up to 1900 bar that prevail in the high-pressure region of above the sealing ring, a metal support ring is disposed between the sealing ring and the annular shoulder. Since at the aforementioned pressures complete tightness of the sealing ring cannot be assured, the support ring, on its underside toward the annular shoulder, is provided with a total of four shallow leak fuel or relief grooves, which furnish a defined lack of tightness between the support ring and the injector housing so as to carry away a leak fuel flow moving past the sealing ring and thus prevent the buildup of a pressure cushion below the sealing ring, which could lead to an unwanted axial displacement of the sealing ring.

Since in injectors for common rail injection systems currently being mass produced by the assignee of this invention, the support ring furthermore rests sealingly with its outer circumferential edge against the adjacent inner wall of the stepped bore, it furthermore has, adjacent to one another in the axial direction on each relief groove, a crescent-shaped indentation recessed out of its outer circumferential edge, which is meant to allow the leak fuel flow to pass between the outer circumferential edge of the support ring and the adjacent inner wall of the stepped bore into the relief grooves. With such an arrangement, however, an unwanted extrusion of the sealing ring material through the recesses and the relief grooves could occur, so that the sealing function of the sealing ring could no longer be assured and consequently failure of the entire injection system could be brought about.

SUMMARY AND ADVANTAGES OF THE INVENTION

The injector of the invention offers the advantage over the prior art that the existing short path through the recesses and relief grooves can be lengthened because of the offset of the recesses and relief grooves, and as a result the frictional forces which counteract an extrusion of the sealing ring material through the recesses and relief grooves can be increased considerably. In other words, the existing direct path is blocked, and a detour is created, which in combination with the small flow cross sections in the region of the detour, in other words between a recess and the adjacent relief groove, counteracts extrusion of the sealing ring material. The passage of the leak fuel flow continues to remain assured, and at the same time its flow velocity is advantageously reduced by the offset arrangement in the circumferential direction of the relief grooves and recesses.

The injector of the invention furthermore has a support ring of sturdy construction, since the weakening zones formed by the relief grooves and the recesses do not coincide, and excessive motions in the region of the recesses, which are suspected to be one of the causes for extrusion of the sealing ring material, are avoided.

By the disposition of the recesses and relief grooves in accordance with the invention, the support ring has a material thickness in the region of the recesses that is greater, by the groove depth of the relief grooves, compared to the prior art. As a result, the lower edges of the recesses come closer to the housing wall of the injector, which in turn in this region results in smaller gap cross sections, which also counteract any extrusion.

In a preferred feature of the invention, it is provided that the relief grooves and the recesses are offset from one another in such a way that one recess each is located between two relief grooves adjacent to one another in the circumferential direction, while conversely, one relief groove each is disposed between two recesses adjacent to one another in the circumferential direction, in both cases preferably in the middle.

A further preferred feature of the invention provides that the support ring, as before, has a total of four recesses, disposed at a spacing of 90° in the circumferential direction, and four relief grooves, also disposed at a spacing of 90° in the circumferential direction, in order to assure an adequate flow cross section for the leak fuel flow, but that the relief grooves are disposed at an angular spacing of 45° from the recesses, and vice versa, in order to create the longest possible detours between adjacent relief grooves and recesses.

The relief grooves, impressed into the support ring, preferably in the form of rounded crescents, expediently have a depth of from 0.05 to 0.1 mm, while the recesses expediently have a crescent-shaped cross section and a depth of from 0.12 to 0.17 mm and are stamped out of the support ring.

In a further preferred feature of the invention, the cross-sectional shape of the annular shoulder of the stepped bore and the cross-sectional shape of the support ring are advantageously adapted to one another in such a way that the support ring, between the recesses, rests with its outer circumferential edge essentially sealingly against a part, located above the annular shoulder, of the inner wall of the stepped bore and, between the relief grooves, rests with parts of its underside sealingly against the annular shoulder of the stepped bore. These parts of the underside that rest sealingly against the annular shoulder preferably border on the valve element and do not extend over the full width of the support ring, so that flow conduits extending radially outward from the sealingly contacting parts between the annular shoulder and the underside of the support ring in its circumferential direction remain open with a small flow cross section and establish a communication between the recesses and relief grooves. The flow conduits are preferably embodied in the underside of the support ring, but they may also be embodied as an annular groove in the annular shoulder. The flow cross section of these flow conduits is expediently essentially equivalent to that of the relief grooves and the recesses.

BRIEF DESCRIPTION OF THE DRAWINGS

The invention will be described in further detail below in terms of an exemplary embodiment taken in conjunction with the drawings, in which.

DESCRIPTION OF THE PREFERRED EMBODIMENT

Figure 1:
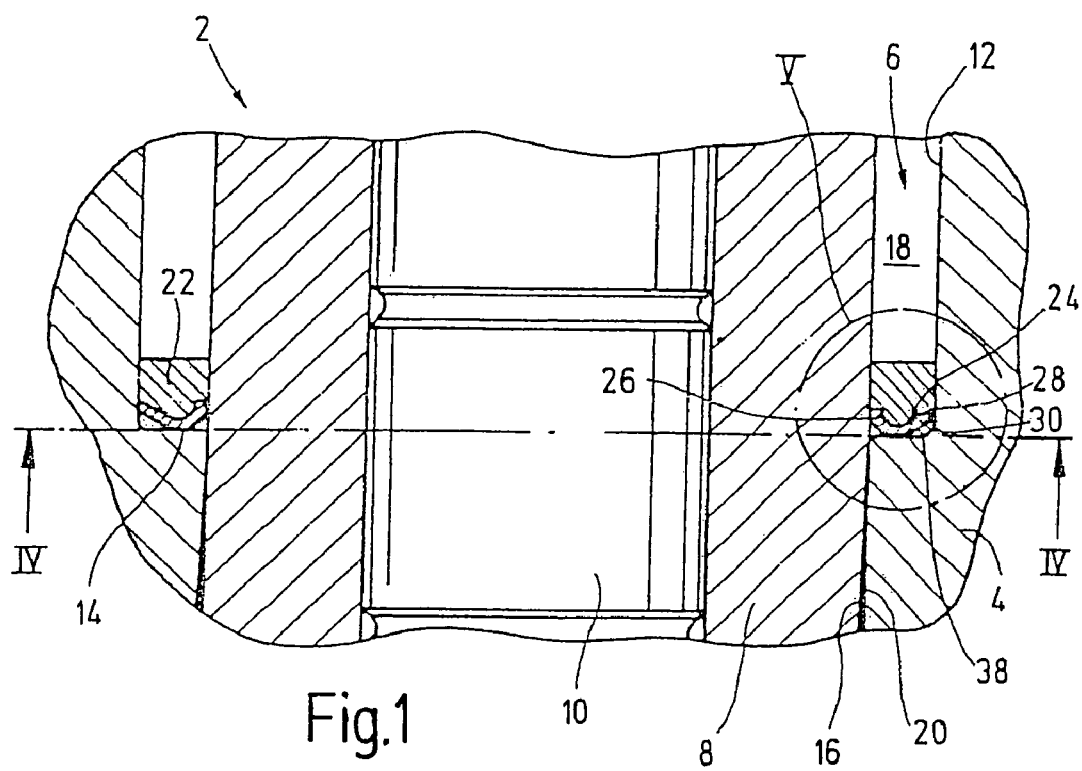
FIG. 1 is a longitudinal sectional view, partly cut away, through an injector of the invention with a support ring.
Figure 2:
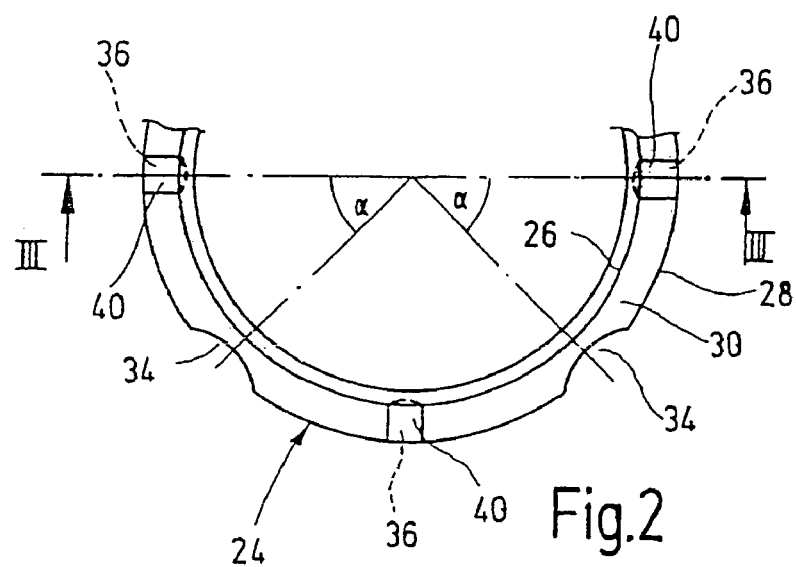
FIG. 2, a top view, partly cut away, of the support ring of FIG. 1.

The injector 2, shown partially in FIG. 1 of the drawing, for a common rail injection system of an internal combustion engine serves to inject fuel from a central high-pressure reservoir, known as a common rail, into the combustion chambers of the engine.

The complete construction of such an injector has been described at length, for instance in German Patent Disclosures DE 196 19 523 A1 and DE 102 20 457 A1 and will therefore not be explained further at this point.

As best seen from FIG. 1, the injector 2 includes an injector housing 4 with a stepped bore 6. A valve element 8 is inserted into the stepped bore 6 and serves as a guide for a control rod 10, with which the opening and closing motions of a nozzle needle (not shown) of the injector 2 can be controlled.

The stepped bore 6 has a widened upper part 12, which is divided by an annular shoulder 14 from a narrowed lower part 16. The inside diameter of the widened upper part 12 of the stepped bore 6 is greater than the outside diameter of the cylindrical valve element 8, so that an annular chamber fluidically communicating with the high-pressure reservoir is formed there around the valve element 8. The inside diameter of the narrowed lower part 16 of the stepped bore 6 is only slightly greater than the outside diameter of the cylindrical valve element 8, so the narrow sealing gap 20 is formed there around the valve element 8.

To prevent fuel from the high-pressure region, formed among other elements by the annular chamber 18, from flowing past the annular shoulder 14 into a low-pressure region formed by the gap 20, among other elements, the lower end of the annular chamber 18 is sealed off by a high-pressure sealing ring 22, which comprises a mixture of polytetrafluoroethylene (PTFE) and bronze powder. To prevent the sealing ring 22, in response to the changing pressures prevailing in the annular chamber of up to approximately 1700 bar, from being extruded into the sealing gap 20, a support ring 24 which is braced on the annular shoulder 14 is disposed below the sealing ring 22.

Figure 3:
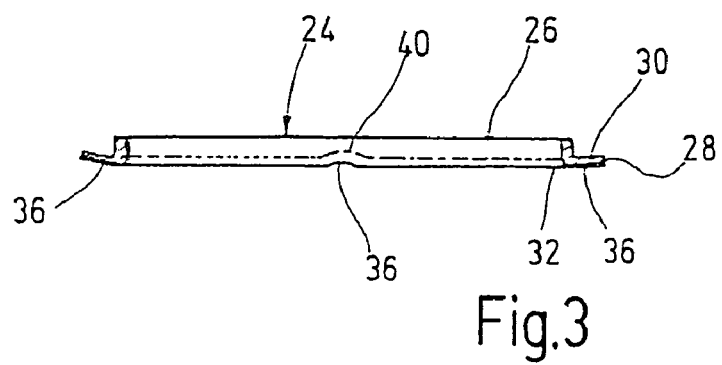
FIG. 3, a cross-sectional view of the support ring along the line III-III of FIG. 2.
Figure 5:
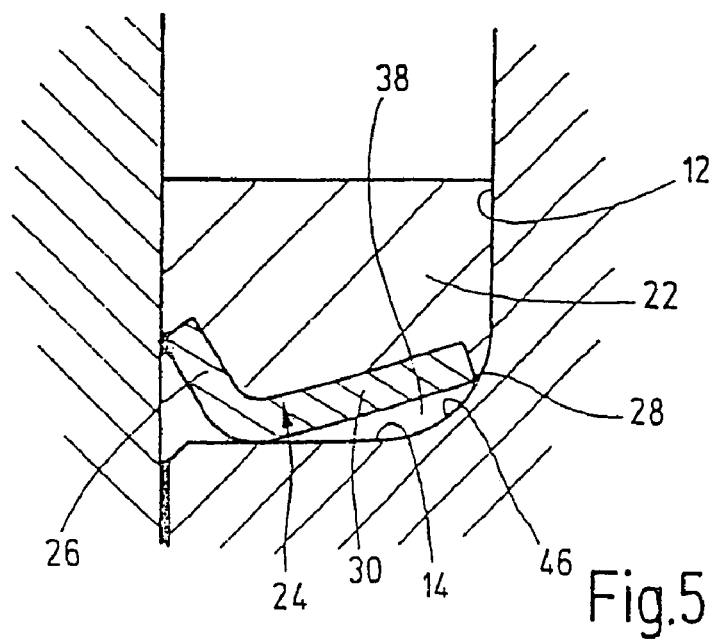
FIG. 5, an enlarged view of detail V of FIG. 1.

As best seen in FIGS. 1, 3 and 5, the one-piece support ring 24 made of C60 sheet steel has an angled cross-sectional shape, which comprises a short inner support ring part 26, which in a press fit contacts the valve element 8, and an outer support ring part 30, resting with its outer circumferential edge 28 in a press fit against the inner wall of the widened part 12 of the stepped bore 6, the support ring parts being joined by a rounded transition 32.

To prevent a fuel pressure cushion from building up below the sealing ring 22 when fuel moves downward past the sealing ring 22, which can cause the sealing ring 22 to be displaced upward away from the annular shoulder 14 so that it can no longer perform its sealing function, flow conduits are provided in the support ring 24; they permit slight quantities of fuel to flow past into the sealing gap 20.

These flow conduits comprise four crescent-shaped recesses 34 in the outermost circumferential edge of the outer support ring part 30 and four radial relief grooves 36 in its underside, which recesses and relief grooves are in fluidic communication with one another. The recesses 34 and the relief grooves 36 are each disposed at equal spacings of 90° around the circumference of the support ring 24, but are offset from one another in the circumferential direction by 45°, in order to prevent an extrusion of the sealing ring material through the flow conduits. The fluidic communication between the recesses 34 and the respective adjacent relief grooves 36 is established by means of the angled form of the support ring 24, which is best seen from FIG. 5. This support ring rests against the annular shoulder 14 only in the region of the transition between the support ring part 26 and the support ring part 30, while the two support ring parts 26 and 30 are oriented obliquely to the annular shoulder 14; the outer support ring part 30 is braced with its outer circumferential edge 28 on the upper end of a transition radius 46, which for reasons of strength is provided between the upper part 12 of the stepped bore 6 and the annular shoulder 14. As a result, below the support ring part 30, an annular interstice 38 is formed, through which fuel from the recesses 34 can reach the relief grooves 36.

The axial recesses 34 have a crescent-shaped cross section with a maximum depth T (FIG. 4) of approximately 0.12 to 0.17 mm and in the production of the support ring 24 they are stamped out of the radial support ring part 30.

Figure 4:
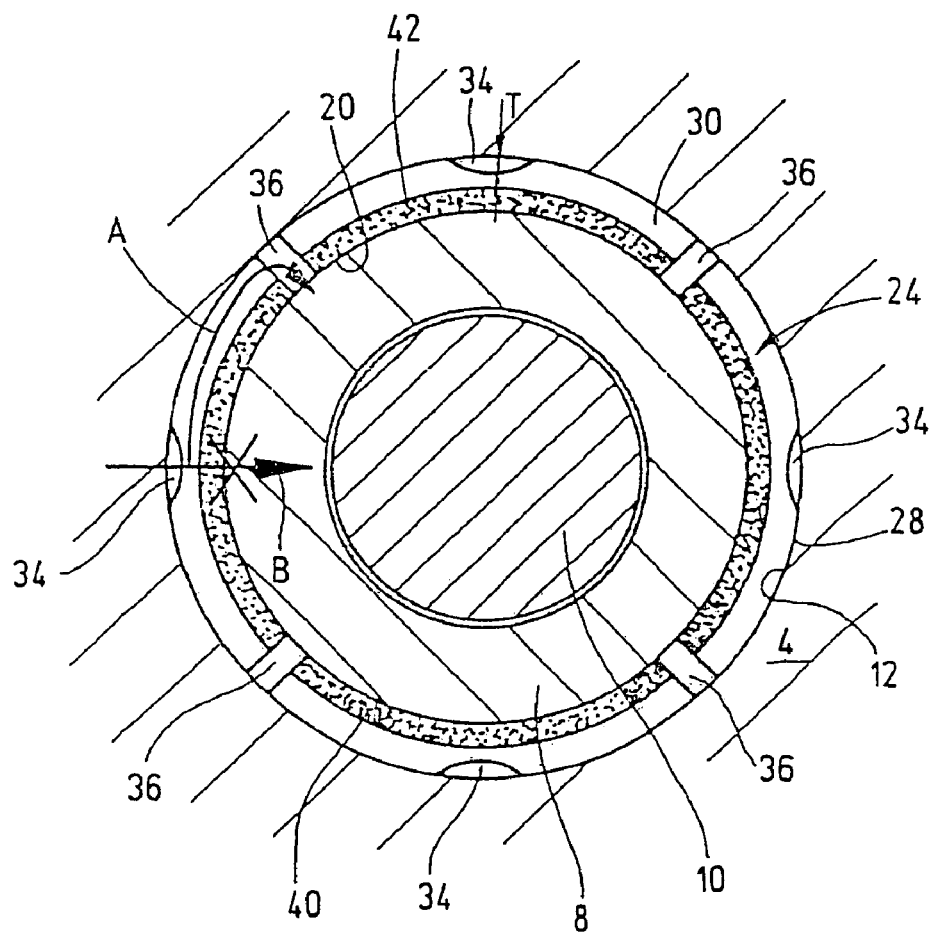
FIG. 4, a cross-sectional view of the injector along the line IV-IV of FIG. 1.

The radial relief grooves 36, with a depth of from 0.05 to 0.1 mm, are formed by crescents 40 of a rounded cross section, which in the production of the support ring 24 are impressed from below into the radial support ring part 30 and which extend over the entire width of the support ring part 30 (FIG. 4).

As best shown in FIG. 4, between the four recesses 34, each support ring 24 rests sealingly with its outer circumferential edge 28 against the inner wall of the widened part 12 of the stepped bore 6, while between the four relief grooves 36, with an inner, annular-segment-shaped part 42 of its underside shown in shaded lines and bordering on the valve element 8, each support ring rests sealingly on the part of the annular shoulder 14 that is located radially inward from the annular space 38.

As indicated by the arrow A in FIG. 4, the leak fuel flow downward past the sealing ring 22 until it reaches the top side of the support ring 24 passes through the recesses 34 between the support ring 24 and the inner wall of the widened part 12 of the stepped bore 6 and from there flows in the circumferential direction through the shallow annular space 38 as far as one of the two adjacent relief grooves 36, through which it then flows radially inward into the gap 20 between the valve element 8 and the injector housing 4, from which place it is carried away. The direct short path to the inside represented by the arrow B is blocked, so that because of the detour, an extrusion of the sealing ring material through the recesses 34 and relief grooves 36 is reliably avoided.

The foregoing relates to a preferred exemplary embodiment of the invention, it being understood that other variants and embodiments thereof are possible within the spirit and scope of the invention, the latter being defined by the appended claims.

The invention claimed is:

1. In an injector for a common rail injection system of an internal combustion engine, having an injector housing, a valve element disposed in the injector housing, a sealing ring acting as a seal between a high-pressure region and a low-pressure region of the injector, and a support ring, disposed together with the sealing ring in an annular chamber between the injector housing and the valve element, for bracing the sealing ring, which is provided, in its underside remote from the sealing ring, with a plurality of relief grooves spaced apart in the circumferential direction and, in its outer circumferential edge, with a plurality of recesses spaced apart in the circumferential direction, the improvement wherein the relief grooves and the recesses are disposed in offset locations from one another in the circumferential direction.

2. The injector as defined by claim 1, wherein one recess each is located between two relief grooves adjacent to one another in the circumferential direction.

3. The injector as defined by claim 2, wherein the recess is disposed in the middle between the adjacent relief grooves.

4. The injector as defined by claim 1, wherein one relief groove each is disposed between two recesses adjacent to one another in the circumferential direction.

5. The injector as defined by claim 2, wherein one relief groove each is disposed between two recesses adjacent to one another in the circumferential direction.

6. The injector as defined by claim 3, wherein one relief groove each is disposed between two recesses adjacent to one another in the circumferential direction.

7. The injector as defined by claim 4, wherein the relief groove is disposed in the middle between the adjacent recesses.

8. The injector as defined by claim 5, wherein the relief groove is disposed in the middle between the adjacent recesses.

9. The injector as defined by claim 6, wherein the relief groove is disposed in the middle between the adjacent recesses.

10. The injector as defined by claim 1, wherein the recesses and the relief grooves are each spaced apart from one another at equal angular spacings.

11. The injector as defined by claim 2, wherein the recesses and the relief grooves are each spaced apart from one another at equal angular spacings.

12. The injector as defined by claim 3, wherein the recesses and the relief grooves are each spaced apart from one another at equal angular spacings.

13. The injector as defined by claim 4, wherein the recesses and the relief grooves are each spaced apart from one another at equal angular spacings.

14. The injector as defined by claim 7, wherein the recesses and the relief grooves are each spaced apart from one another at equal angular spacings.

15. The injector as defined by claim 1, wherein the support ring comprises four relief grooves and four recesses, and wherein the recesses are disposed at a spacing of 45° from the relief grooves.

16. The injector as defined by claim 1, wherein the support ring comprises a substantially axial support ring part and a substantially radial support ring part, which is provided with the relief grooves in its underside remote from the sealing ring and with the recesses in its outer circumferential edge.

17. The injector as defined by claim 10, wherein the support ring comprises a substantially axial support ring part and a substantially radial support ring part, which is provided with the relief grooves in its underside remote from the sealing ring and with the recesses in its outer circumferential edge.

18. The injector as defined by claim 15, wherein the support ring comprises a substantially axial support ring part and a substantially radial support ring part, which is provided with the relief grooves in its underside remote from the sealing ring and with the recesses in its outer circumferential edge.

19. The injector as defined by claim 1, wherein the support ring is braced against an annular shoulder of the injector housing, whose cross-sectional shape is adapted to the cross-sectional shape of the support ring in such a way that with its outer circumferential edge, the support ring rests essentially sealingly between the recesses against the injector housing above the annular shoulder, and with parts of its underside, the support ring rests sealingly against the annular shoulder between the relief grooves, and the parts that rest sealingly are oriented toward the valve element and do not extend over the full width of the support ring.

20. A common rail injection system, comprising at least one injector as defined by claim 1.

* * * * *